United States Patent [19]

Kissell

[11] 4,326,844
[45] Apr. 27, 1982

[54] METHOD AND APPARATUS FOR CURING FIBROUS MINERAL MATERIAL

[75] Inventor: Ronald E. Kissell, Alexandria, Ohio

[73] Assignee: Owens-Corning Fiberglas Corporation, Toledo, Ohio

[21] Appl. No.: 181,274

[22] Filed: Aug. 25, 1980

[51] Int. Cl.³ .............................................. F27B 14/00
[52] U.S. Cl. ..................................... 432/13; 264/109; 425/384; 425/461; 432/59
[58] Field of Search .................. 432/13, 59; 264/45.3, 264/46.2, 112, 122, 160, 165, 257; 425/80.1, 81.1, 82.1, 83.1, 383, 384, 461

[56] References Cited

U.S. PATENT DOCUMENTS 3,025,202  3/1962  Morgan et al. .................... 264/46.3
4,115,498  9/1978  Kissell et al. ....................... 264/119

Primary Examiner—John J. Camby
Attorney, Agent, or Firm—Ronald C. Hudgens; Philip R. Cloutier; Ted C. Gillespie

[57] ABSTRACT

A method and apparatus for curing fibrous mineral material of the type in which the material containing heat-curable binder is passed through a curing station having a curing element adapted to apply heat and pressure is provided in which a convex portion at the upstream end of the curing element is adapted to apply greater pressure to the fibrous mineral material than does the remainder portion of the curing element.

12 Claims, 3 Drawing Figures

METHOD AND APPARATUS FOR CURING FIBROUS MINERAL MATERIAL

TECHNICAL FIELD

This invention pertains to handling fibrous mineral material, such as fibrous glass material. In one of its more specific aspects, this invention relates to curing the heat-curable or thermoplastic binder on fibrous mineral material, such as insulation material, by contacting the material with hot curing air or a heated curing plate.

BACKGROUND OF THE INVENTION

A common practice in manufacturing insulation products from fibrous mineral material is coating the fibers with an organic binder, such a phenolic resin, and collecting the fibers in the form of a pack. The uncured pack is then passed through an oven through which flow high temperature gases to cure the organic binder on the fibers, thereby bonding the fibers together. Some curing systems for fibrous mineral material utilize heated plates which cure the binder by radiation and conduction. The plates can be adapted with hot air passageways for the passage of curing gases therethrough. Heated plates can also be used in pre-cure or post-cure processes in which the surface of the fibrous mineral material is passed in contact with the plate to provide a smooth surface on the product.

One of the problems associated with curing fibrous mineral material products with heated plates is that as the resinous binder material is heated it becomes sticky, and tends to gum up the curing apparatus. Prior to entering the curing apparatus the binder is generally maintained at a temperature below 100° F. (38° C.) at which temperature the binder is not sticky. Once the binder reaches a temperature above approximately 550° F. (288° C.), cure of the binder is effected, and the binder is not sticky. In the interim temperature range, from about 100° F. (38° C.) to about 550° F. (288° C.), however, the water is driven off the binder, causing the binder to become more viscous and sticky, resulting in fouling of the curing equipment. In an attempt to solve the above problem, the entrance plates positioned upstream from the heated curing elements are usually provided with passageways for water cooling fluid. Nevertheless, even though the use of water cooling maintains the binder in the less-than-sticky temperature range, below 100° F. (38° C.), as long as possible, the binder still must pass through the transition temperature range, 100° F. (38° C.) to 550° F. (288° C.), at which time the binder is sticky. This invention provides a solution to the problem of sticking binder during the curing process.

SUMMARY OF THE INVENTION

According to this invention, there is provided apparatus for curing fibrous mineral material of the type in which fibrous mineral material containing heat-curable or thermoplastic binder thereon is passed through a curing station having a curing element adapted to apply heat and pressure to cure the binder on the fibrous mineral material passed therethrough, where the curing element has a convex portion at its upstream end to apply greater pressure to the fibrous mineral material than does the remainder portion of the curing element. The use of the convex surface at the upstream end of the curing element results in greater pressure being applied to the wool pack at the point of the convex surface, thereby enabling reduced sticking of cured or partially cured binder material on the surfaces of the curing element. The zone of increased pressure coincides with the temperature zone exhibiting the critical binder sticking problem which occurs as the glass wool passes from the relatively cool entrance of the curing station to the hot curing element of the curing station. The apparatus of this invention can be used to apply a surface cure to the uncured wool pack, wherein the binder on the fibers on and near the surface are sufficiently cured to enable the pack to withstand subsequent curing and handling operations. The curing apparatus of the invention can also be used for curing all of the binder on the fibers in the pack. Alternatively, the curing apparatus of the invention can be used to apply a post-cure surfacing to a fibrous pack.

In a particular embodiment, an entrance element adapted for the passage of a cooling fluid therethrough is positioned upstream from the curing element. The entrance element can be adapted with a convex surface to apply a greater pressure to the fibrous mineral material than does the remainder portion of the curing element.

In another embodiment, the invention comprises an opposed pair of curing elements.

In a preferred embodiment of the invention, the relatively cool entrance element and the curing element define a cool zone, a hot zone, and a transition zone positioned therebetween, and the curing element has a convex portion positioned within the transition zone to apply greater pressure to the fibrous mineral material than does the remainder portion of the curing element.

In a particular embodiment of the invention, the temperature of the cool zone is below that at which the binder becomes sticky, and the temperature of the hot zone is above that at which the binder is sticky. The temperature of the transition zone can be within the range of from about 100° F. (38° C.) to 550° F. (288° C.).

In the most preferred embodiment of the invention, the entrance element and convex portion of the curing element extend in a direction of the fibrous mineral material beyond the plane of the remainder portion.

According to this invention, there is also provided a method for curing fibrous mineral material of the type in which fibrous mineral material containing heat curable or thermoplastic binder thereon is passed through a curing station having a curing element adapted to apply heat and pressure to cure the binder on the fibrous mineral material passed therethrough, and further comprising establishing a cool zone upstream from the curing element, a hot zone in contact with the curing element, and a transition zone positioned between the cool zone and the hot zone, and applying greater pressure to the fibrous mineral material in the transition zone than in either the cool zone or the hot zone.

In a specific embodiment of the invention, the pressure is applied by providing a convex portion at the upstream end of the curing element.

In a preferred embodiment of the invention, the temperature of the cool zone is maintained below that at which the binder becomes sticky, and the temperature of the hot zone is maintained above that at which the binder is sticky.

In the most preferred embodiment of the invention, the temperature of the transition zone is within the range of from about 100° F. (38° C.) to about 550° F. (288° C.).

DESCRIPTION OF THE INVENTION

The invention will be described with reference to the curing of mineral wool packs made from glass fibers. It is to be understood that the principles of the invention apply equally well to the curing of any other fibrous mineral material.

Figure 1:
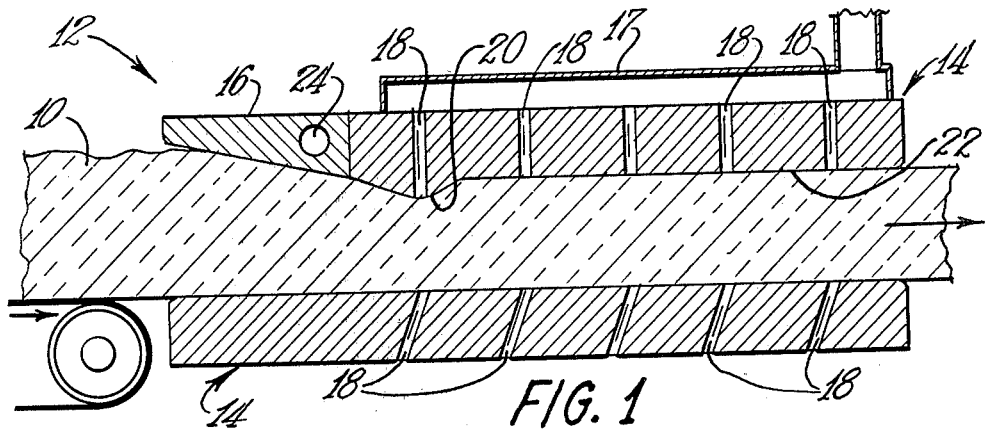
FIG. 1 is a schematic cross-sectional elevation view of apparatus for curing fibrous mineral material according to the principles of the invention.

As shown in FIG. 1, glass wool pack 10 is advanced through curing station 12, which is itself comprised of curing elements 14 and entrance element 16. The curing elements can be heated by resistance heating means, not shown. Alternatively, hot curing gases, supplied through manifold 17 from a source not shown, can be passed through passageways 18. It is to be understood that the curing apparatus of the invention can be adapted with a single curing element which acts upon only one surface of the wool pack. The curing element is divided into upstream portion 20 and remainder portion 22. The upstream portion has a convex configuration which protrudes downwardly in the direction of the pack below the plane of the remainder portion of the curing element. As the wool pack passes beneath the curing element, the upstream portion of the curing element will apply greater pressure on the wool pack, thereby producing a wiping action which prevents the build up of sticky binder on the convex surface. The downward protrusion of the convex surface can be to the extent within the range of from about 10 percent to about 50 percent of the final thickness of the pack, and, preferably, to the extent of about 25 percent of the final thickness of the pack.

Figure 2:
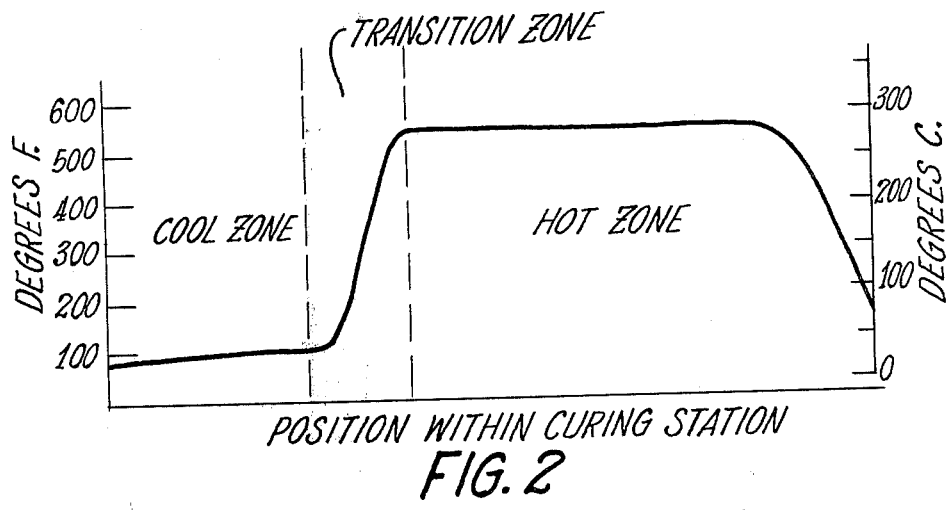
FIG. 2 is a graph of binder temperature as a function of position within the curing apparatus of FIG. 1.

As shown in the graph of FIG. 2, the entrance element and the curing element define a cool zone positioned upstream from the curing element and a hot zone in contact with the curing element, the cool zone having a temperature of approximately 100° F. (38° C.) and the hot zone having a temperature in excess of 550° F. (288° C.). Positioned in between the cool zone and the hot zone is the transition zone in which the temperature rises from approximately 100° F. (38° C.) to approximately 550° F. (288° C.). It is within this transition zone that the binder becomes sticky, and is most likely to stick on curing surfaces. It is important that the increased pressure applied to the pack by the upstream portion of the curing element be applied within the transition zone. It is to be understood that the temperature ranges of the cool zone, transition zone, and hot zone will be a function of the particular binder system used on the mineral fibers.

Figure 3:
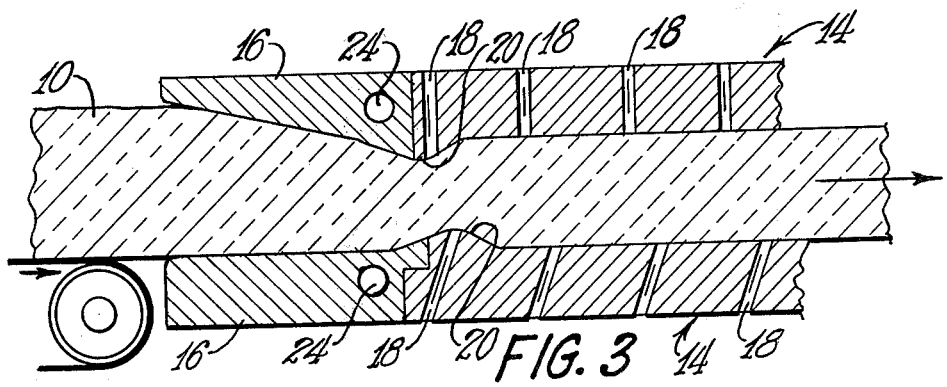
FIG. 3 is a schematic cross-sectional elevation view of an alternate embodiment.

The entrance element can also have a convex surface which protrudes downwardly below the plane of the remainder portion of the curing element, as shown in FIG. 3. The entrance element convex surface is also adapted to apply greater pressure to the glass wool pack and thereby experience the same wiping action for resinous binder material which tended to stick. The entrance element can be adapted with cooling fluid passage 24 for the circulation of cooling fluid.

As shown in FIG. 3, the curing station can be adapted with two curing elements, which can have transition members positioned at their upstream ends.

EXPLOITATION IN INDUSTRY

This invention will be found to be useful in the curing of glass fibers for such uses as glass fiber thermal insulation products.

I claim:

1. Apparatus for curing fibrous mineral material of the type in which fibrous mineral material containing heat-curable or thermoplastic binder thereon is passed through a curing station having a curing element with a surface adapted to contact the fibrous mineral material and apply heat and pressure to cure the binder on the fibrous mineral material passed therethrough, wherein the improvement comprises the surface of said curing element being divided into a convex upstream portion and a remainder portion, said convex upstream portion protruding in the direction of the fibrous mineral material to apply greater pressure to the fibrous mineral material than does the remainder portion of said curing element.

2. The apparatus of claim 1 comprising an entrance element adapted for the passage of a cooling fluid therethrough and positioned in said curing station upstream from said curing element.

3. The apparatus of claim 2 in which said entrance element is adapted with a convex surface to apply greater pressure to the fibrous mineral material than does the remainder portion of said curing element.

4. The apparatus of claims 1 or 2 comprising an opposed pair of said curing elements.

5. Apparatus for curing fibrous mineral material of the type in which fibrous mineral material containing heat-curable or thermoplastic binder thereon is passed through a curing station having a curing element with a surface adapted to contact the fibrous mineral material and apply heat and pressure to the fibrous mineral material to cure the binder thereon, wherein the improvement comprises a relatively cool entrance element positioned upstream from said curing element, said entrance element and said curing element together defining a cool zone, a hot zone, and a transition zone positioned therebetween, and the surface of said curing element being divided into a convex upstream portion and a remainder portion, said convex upstream portion being positioned within said transition zone and protruding in the direction of the fibrous mineral material to apply greater pressure to the fibrous mineral material in said transition zone that does the remainder portion of said curing element in said hot zone.

6. The apparatus of claim 5 in which the temperature of said cool zone is below that at which said binder becomes sticky, and the temperature of said hot zone is above that at which said binder is sticky.

7. The apparatus of claim 6 in which the temperature of said transition zone is within the range of from about 100° F. (38° C.) to about 550° F. (288° C.).

8. The apparatus of claim 7 in which said entrance element is adapted with a convex surface to apply greater pressure to the fibrous mineral material than does the remainder portion of said curing element.

9. The method for curing fibrous mineral material of the type in which fibrous mineral material containing heat curable or thermoplastic binder thereon is passed through a curing station having a cool zone and a curing element positioned downstream from said cool zone, said curing element being adapted to apply heat and pressure to the surface of the fibrous mineral material passed through said curing station to cure the binder and said curing element defining a hot zone and a transition zone positioned between said cool zone and said hot zone, wherein the improvement comprises applying greater pressure to the fibrous mineral material in said transition zone than in either said cool zone or said hot zone.

10. The method of claim 9 comprising applying said greater pressure by providing the upstream portion of said curing element with a convex surface.

11. The method of claim 9 comprising maintaining the temperature of said cool zone at a temperature below that at which said binder becomes sticky, and maintaining the temperature of said hot zone at a temperature above that at which said binder is sticky.

12. The method of claim 11 comprising maintaining the temperature of said transition zone within the range of from about 100° F. (38° C.) to about 550° F. (288° C.).

* * * * *